(12) United States Patent
Springer et al.

(10) Patent No.: US 9,051,874 B2
(45) Date of Patent: *Jun. 9, 2015

(54) INTERNAL COMBUSTION ENGINE WITH PARTIAL DEACTIVATION AND METHOD FOR THE OPERATION OF AN INTERNAL COMBUSTION ENGINE OF SAID TYPE

(71) Applicant: Ford Global Technologies, LLC, Dearborn, MI (US)

(72) Inventors: Moritz Klaus Springer, Hagen (DE); Helmut Hans Ruhland, Eschweiler (DE); Albert Breuer, Cologne (DE); Thomas Lorenz, Cologne (DE); Jan Linsel, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 28 days.

This patent is subject to a terminal disclaimer.

(21) Appl. No.: 13/860,443

(22) Filed: Apr. 10, 2013

(65) Prior Publication Data

US 2013/0276759 A1    Oct. 24, 2013

(30) Foreign Application Priority Data

Apr. 24, 2012   (EP) .................................... 12165331

(51) Int. Cl.
*F02D 17/02*   (2006.01)
*F02B 75/04*   (2006.01)
(Continued)

(52) U.S. Cl.
CPC ............ *F02B 75/04* (2013.01); *F02D 41/0082* (2013.01); *F02D 41/0087* (2013.01); *F02B 73/00* (2013.01); *F02D 15/00* (2013.01); *F02D 17/02* (2013.01); *Y02T 10/12* (2013.01)

(58) Field of Classification Search
CPC ...... F02B 75/04; F02B 73/00; F02D 41/0082; F02D 41/0087; F02D 15/00; F02D 17/02; Y02T 10/12
USPC .......... 123/198 F, 399, 672, 681; 60/284, 288
See application file for complete search history.

(56) References Cited

U.S. PATENT DOCUMENTS 4,107,921 A  *  8/1978  Iizuka ............................ 60/288
4,344,393 A  *  8/1982  Etoh et al. ..................... 123/672
(Continued)

FOREIGN PATENT DOCUMENTS

DE          665392 C       9/1938
JP          S59200037 A    11/1984
(Continued)

OTHER PUBLICATIONS

Springer, Moritz Klaus et al., "Internal Combustion Engine with Partial Deactivation and Method for the Operation of an Internal Combustion Engine of Said Type," U.S. Appl. No. 13/860,446, filed Apr. 10, 2013, 34 pages.
(Continued)

*Primary Examiner* — Marguerite McMahon
(74) *Attorney, Agent, or Firm* — Julia Voutyras; Alleman Hall McCoy Russell & Tuttle LLP (57) ABSTRACT

A system is provided for an internal combustion engine comprising, at least two cylinders wherein the at least two cylinders form at least two groups, wherein each group comprises at least one cylinder, the at least one cylinder of at least one group being formed as a cylinder which can be activated in a load-dependent manner and which is deactivated if a predefined load is undershot. The at least two groups are characterized by different compression ratios, the at least one cylinder of a first group having a higher compression ratio and the at least one cylinder of a second group having a lower compression ratio and the at least one cylinder of the second group comprises an activatable and deactivatable cylinder. Use of the first cylinder group, and deactivation of the second cylinder group during partial loads increases engine efficiency and fuel economy.

6 Claims, 4 Drawing Sheets

(51) Int. Cl.
  *F02D 41/00*  (2006.01)
  *F02B 73/00*  (2006.01)
  *F02D 15/00*  (2006.01)

(56) References Cited

U.S. PATENT DOCUMENTS

| | | | |
|---|---|---|---|
| 4,455,984 A | | 6/1984 | Merlini et al. |
| 4,781,160 A | * | 11/1988 | Lohr et al. ............... 123/198 F |
| 6,640,543 B1 | * | 11/2003 | Seal ............................. 60/609 |
| 6,739,123 B2 | * | 5/2004 | Glugla et al. ................. 60/284 |
| 6,922,986 B2 | * | 8/2005 | Rozario ......................... 60/284 |
| 2002/0148439 A1 | * | 10/2002 | Kawasaki ..................... 123/399 |
| 2005/0034701 A1 | * | 2/2005 | Betz et al. ................ 123/198 F |
| 2007/0131183 A1 | | 6/2007 | Shei |
| 2008/0029057 A1 | * | 2/2008 | Hergart et al. ............ 123/198 F |
| 2009/0030589 A1 | * | 1/2009 | Irisawa ........................ 701/103 |
| 2011/0094475 A1 | * | 4/2011 | Riegel et al. ............. 123/406.23 |

FOREIGN PATENT DOCUMENTS

| | | |
|---|---|---|
| WO | 03067059 A1 | 8/2003 |
| WO | 2010003675 A1 | 1/2010 |

OTHER PUBLICATIONS

Springer, Moritz Klaus et al., "Auto-Ignition Internal Combustion Engine with Partial Deactivation and Method for the Operation of an Internal Combustion Engine of Said Type," U.S. Appl. No. 13/860,448, filed Apr. 10, 2013, 28 pages.

Springer, Moritz Klaus et al., "Auto-Ignition Internal Combustion Engine with Partial Deactivation and Method for the Operation of an Internal Combustion Engine of Said Type," U.S. Appl. No. 13/860,450, filed Apr. 10, 2013, 29 pages.

* cited by examiner

INTERNAL COMBUSTION ENGINE WITH PARTIAL DEACTIVATION AND METHOD FOR THE OPERATION OF AN INTERNAL COMBUSTION ENGINE OF SAID TYPE

CROSS REFERENCE TO RELATED APPLICATIONS

The present application claims priority to European Patent Application No. 12165331.5, filed on Apr. 24, 2012 the entire contents of which are hereby incorporated by reference for all purposes.

TECHNICAL FIELD

The present application relates to variable displacement internal combustion engines.

BACKGROUND AND SUMMARY

In the development of internal combustion engines, it is a basic aim to minimize fuel consumption, wherein the emphasis in the efforts being made is on obtaining an improved overall efficiency. Fuel consumption and thus efficiency pose a problem in particular in the case of Otto-cycle engines, that is to say in the case of a spark ignition internal combustion engine. The reason for this lies in the principle of the operating process of the Otto-cycle engine.

The Otto-cycle engine operates—if direct injection is not provided—with a homogeneous fuel/air mixture which is prepared by external mixture formation by virtue of fuel being introduced into the inducted air in the intake tract. Load control is generally carried out by means of a throttle flap provided in the intake tract. The further the throttle flap is closed the higher the pressure loss of the inducted air across the throttle flap, and the lower the pressure of the inducted air downstream of the throttle flap and upstream of the inlet into the at least two cylinders. For a constant combustion chamber volume, it is possible in this way for the air mass, that is to say the quantity, to be set by means of the pressure of the inducted air. This also explains why said type of quantity regulation has proven to be disadvantageous specifically in the part-load range, because low loads uses a high degree of throttling and a significant pressure reduction in the intake tract, as a result of which the charge exchange losses increase with decreasing load and increasing throttling.

To reduce the described losses, various strategies for dethrottling an internal combustion engine have been developed. Owing to the fact that the Otto-cycle engine exhibits poor efficiency in part-load operation as a result of throttling, but by contrast the diesel engine exhibits greater efficiency, that is to say lower fuel consumption, owing to the quality regulation, tests have been carried out with regard to combining the two working processes with one another in order to make it possible to apply the advantages of the diesel engine process to the Otto-cycle engine process.

The conventional Otto-cycle engine process is characterized by mixture compression, a homogeneous mixture, spark ignition and quantity regulation, whereas the traditional diesel engine process is characterized by air compression, an inhomogeneous mixture, auto-ignition and quality regulation. One approach to a solution for dethrottling the Otto-cycle engine is for example an Otto-cycle engine working process with direct injection. The direct injection of the fuel is a suitable means for realizing a stratified combustion chamber charge. The mixture formation takes place by the direct injection of the fuel into the cylinder or into the air situated in the cylinders, and not by external mixture formation, in which the fuel is introduced into the intake air in the intake tract.

Another option for optimizing the combustion process of an Otto-cycle engine may be the use of an at least partially variable valve drive. By contrast to conventional valve drives, in which both the lift of the valves and also the timing are invariable, these parameters which have an influence on the combustion process, and thus on fuel consumption, can be varied to a greater or lesser extent by means of variable valve drives. The ideal solution would be fully variable valve control which permits specially adapted values for the lift and the timing for any desired operating point of the Otto-cycle engine. Noticeable fuel savings can however be obtained with partially variable valve drives. Throttling-free and thus loss-free load control is already possible if the closing time of the inlet valve and the inlet valve lift can be varied. The mixture mass which flows into the combustion chamber during the intake process is then controlled not by means of a throttle flap but rather by means of the inlet valve lift and the opening duration of the inlet valve.

A further approach to a solution for dethrottling an engine is offered by cylinder deactivation, that is to say the deactivation of individual cylinders in certain load ranges. The efficiency of the engine in part-load operation can be improved, that is to say increased, by means of a partial deactivation because the deactivation of one cylinder of a multi-cylinder internal combustion engine increases the load on the other cylinders, which remain in operation, if the engine power remains constant, such that the throttle flap can or may be opened further in order to introduce a greater air mass into said cylinders, whereby dethrottling of the internal combustion engine is attained overall. Furthermore, during the partial deactivation, that is to say at part load, the cylinders which are permanently in operation often operate in the region of higher loads, at which the specific fuel consumption is lower. The load collective is shifted toward higher loads.

The cylinders which remain in operation during the partial deactivation furthermore exhibit improved mixture formation owing to the greater air mass supplied, and tolerate higher exhaust-gas recirculation rates. Further advantages with regard to efficiency are attained in that a deactivated cylinder, owing to the absence of combustion, does not generate any wall heat losses owing to heat transfer from the combustion gases to the combustion chamber walls.

Disclosed herein is a system and method for a variable displacement engine which addresses the above described problems and improves on conventional engines with deactivatable cylinders. The object of the present disclosure is an internal combustion engine having at least two cylinders, forming at least two groups. The cylinders of a first group remain active during partial loads, the cylinders of a second group are deactivated when a predefined load is undershot. The at least two groups are characterized by different compression ratios $\epsilon_i$, the at least one cylinder of a first group having a greater compression ratio $\epsilon_1$ and the at least one cylinder of a second group having a lesser compression ratio $\epsilon_2$, where $\epsilon_2 < \epsilon_1$, the at least one cylinder of the second group comprises an activatable and deactivatable cylinder.

In part-load operation of the internal combustion engine, the at least one cylinder of the second group is deactivated if a predefined load is undershot, whereby the load demand on the at least one remaining cylinder increases, and an opening of the throttle flap may introduce a greater air mass into said cylinder.

In addition to said effect which contributes to the dethrottling of the internal combustion engine, the partial deactivation in part-load operation is further optimized by means of a structural feature of the internal combustion engine according to the disclosure, specifically by virtue of the fact that, in the internal combustion engine according to the disclosure, the group of cylinders permanently in operation and the group of activatable and deactivatable cylinders have different compression ratios $\epsilon_i$.

In the present case, the cylinders, which are permanently in operation, of the first group have a higher compression ratio $\epsilon_1$, such that in part-load operation, said cylinders have a noticeably higher efficiency $\eta$, in particular a higher efficiency than if said cylinders had the lower compression ratio $\epsilon_2$ of the activatable and deactivatable cylinders. It must be taken into consideration here that the efficiency $\eta$ correlates more or less with the compression ratio $\epsilon_i$, that is to say the efficiency $\eta$ is generally higher in the case of a relatively high compression ratio $\epsilon_i$ and is generally lower in the case of a relatively low compression ratio $\epsilon_i$.

The different compression ratios $\epsilon_i$ are the result of the configuration of the cylinder groups for different operating or load ranges. Whereas the cylinders which are permanently in operation are configured for part-load operation of the internal combustion engine, the group of activatable cylinders is configured for higher, high and maximum loads. The cylinders, which are permanently in operation, of the first group may be provided with a higher compression ratio $\epsilon_1$ and thus configured for optimized part-load operation of the internal combustion engine, because an increased knocking tendency is not to be expected in said load range. By contrast, the activatable cylinders, that is to say the cylinders which are activated in the case of increasing load demand, are configured for high loads. According to the disclosure, said cylinders should be provided with a relatively low compression ratio, because the knocking tendency increases not only with the compression ratio but rather also with increasing load. Although this reduces the efficiency of said cylinder group, it provides security against knocking at high loads at which said cylinders are primarily used.

A system is provided for an internal combustion engine comprising, at least two cylinders wherein the at least two cylinders form at least two groups, wherein each group comprises at least one cylinder, the at least one cylinder of at least one group being formed as a cylinder which can be activated in a load-dependent manner and which is deactivated if a predefined load is undershot. The at least two groups are characterized by different compression ratios, the at least one cylinder of a first group having a higher compression ratio and the at least one cylinder of a second group having a lower compression ratio and the at least one cylinder of the second group comprises an activatable cylinder. Use of the first cylinder group, and deactivation of the second cylinder group during partial loads increases engine efficiency and fuel economy.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Further, the inventors herein have recognized the disadvantages noted herein, and do not admit them as known.

DETAILED DESCRIPTION

The object of the present disclosure is a variable displacement engine comprising an engine formed of at least two cylinder groups, wherein each cylinder group comprises at least one cylinder. The compression ratio of the two cylinder groups differ such that the first cylinder group comprises a higher compression ratio and the second cylinder group comprises a lower compression ratio. The first cylinder group with the higher compression ratio is suited for partial engine loads and is maintained activated. The second cylinder group, with the lower compression ratio, is activatable under high and maximal engine loads.

Figure 1:
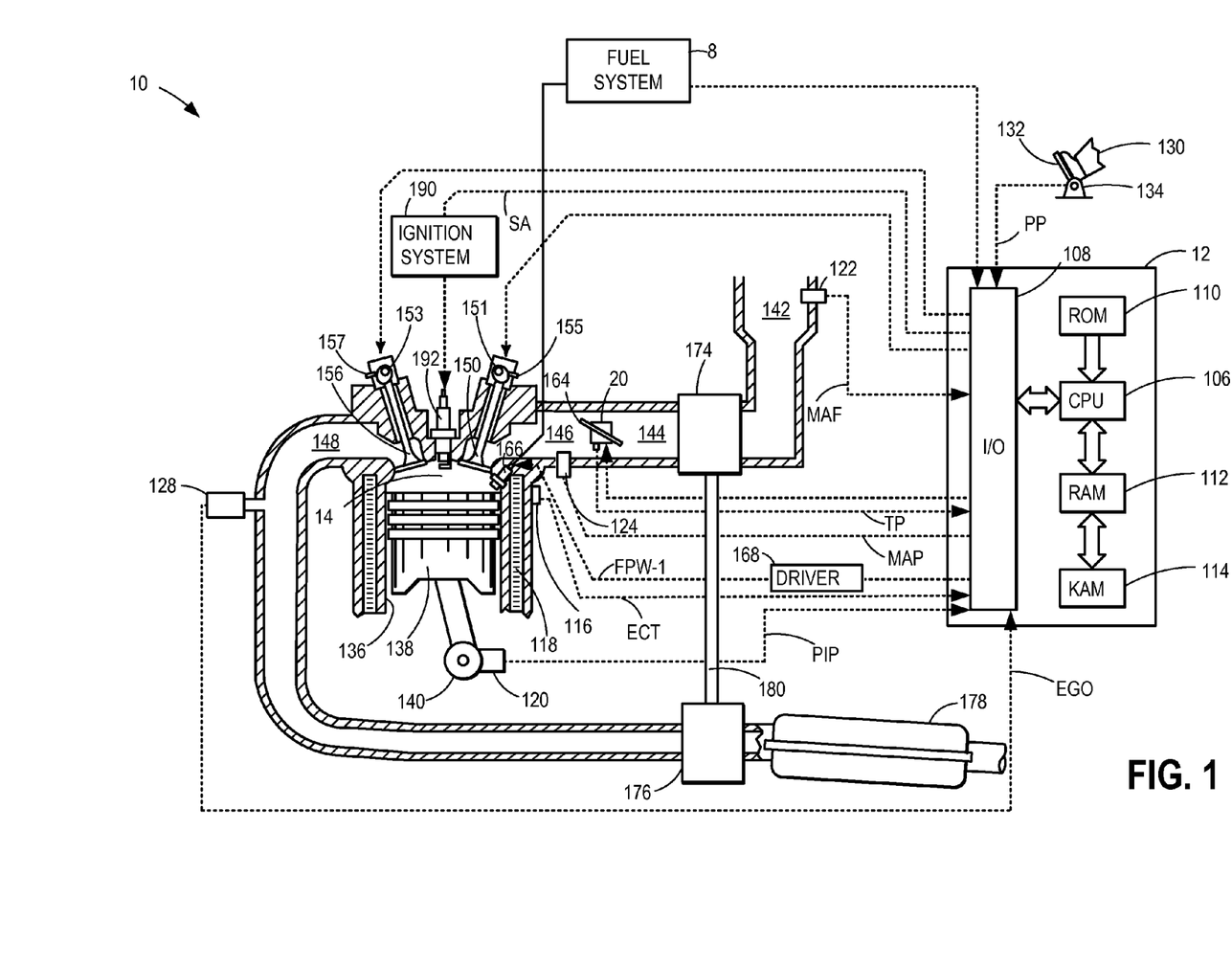
FIG. 1 shows an example cylinder of an engine in accordance with the present disclosure.

FIG. 1 shows an example cylinder of an engine in accordance with the present disclosure, the example cylinder shown may be of either than the first or the second cylinder group and is provided merely as reference for illustrating engine components. The relative compression ratio and other properties of the first and second cylinder groups will be discussed in greater detail below herein.

FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Embodiments of the internal combustion engine may be advantageous in which a regulable throttle flap is provided for load control. An advantage of the regulable throttle flap is that, upon the activation or deactivation of the partial deactivation, that is to say of a cylinder, the torque of the engine does not fall or rise, and the driver may not adjust the accelerator pedal in order to maintain the load, as would be the case with a non-regulable throttle flap.

It is preferable for the regulable throttle flap to be an electronically regulated throttle flap, and for an engine controller to perform the regulation of said throttle flap. Said embodiment is also preferable with regard to costs. Here, embodiments may be advantageous in which the throttle flap can be regulated in a closed-loop process.

Exhaust passage 148 may receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system. A cam timing may be adjusted (by advancing or retarding the VCT system) to adjust an engine dilution in coordination with an EGR flow thereby reducing EGR transients and improving engine performance.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock. Furthermore, in the present disclosure the compression ratio of the at least two cylinder groups may vary, described in greater detail below.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

Embodiments of the internal combustion engine may be advantageous in which each cylinder is equipped with an ignition plug for initiating the spark ignition. The ignition plug is an ignition device for the reliable initiation of an ignition spark, which also has durability and is also inexpensive. It is nevertheless also possible for other ignition devices to be used for initiating the spark ignition.

As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more precise during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

Embodiments of the internal combustion engine may be advantageous in which each cylinder is equipped with an injection nozzle for the purpose of providing a fuel supply by means of direct injection.

Firstly, the direct injection of the fuel into the cylinder is, like the partial deactivation itself and as has already been discussed in detail further above, a suitable means for dethrottling the internal combustion engine, such that the two measures, that is to say firstly the partial deactivation and secondly the direct injection, assist and complement one another in realizing the dethrottling.

Secondly, the direct injection permits a deactivation and activation of the fuel supply from one working cycle to the next. The direct injection ensures an effective and reliable deactivation of the at least one activatable cylinder, wherein it is the aim for the fuel supply to be stopped as completely as possible from one working cycle to the next; this is also the case in particular with regard to fuel consumption and pollutant emissions.

Nevertheless, embodiments of the internal combustion engine may be advantageous in which an intake pipe injection means is provided for the purposes of supplying fuel.

As described above, FIG. 1 shows one cylinder of a multi-cylinder engine. As such each cylinder may similarly include its own set of intake/exhaust valves, fuel injector(s), spark plug, etc.

While not shown, it will be appreciated that engine may further include one or more exhaust gas recirculation passages for diverting at least a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. The one or more EGR passages may include an LP-EGR passage coupled between the engine intake upstream of the turbocharger compressor and the engine exhaust downstream of the turbine, and configured to provide low pressure (LP) EGR. The one or more EGR passages may further include an HP-EGR passage coupled between the engine intake downstream of the compressor and the engine exhaust upstream of the turbine, and configured to provide high pressure (HP) EGR. In one example, an HP-EGR flow may be provided under conditions such as the absence of boost provided by the turbocharger, while an LP-EGR flow may be provided during conditions such as in the presence of turbocharger boost and/or when an exhaust gas temperature is above a threshold. The LP-EGR flow through the LP-EGR passage may be adjusted via an LP-EGR valve while the HP-EGR flow through the HP-EGR passage may be adjusted via an HP-EGR valve (not shown).

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed.

Figure 2:
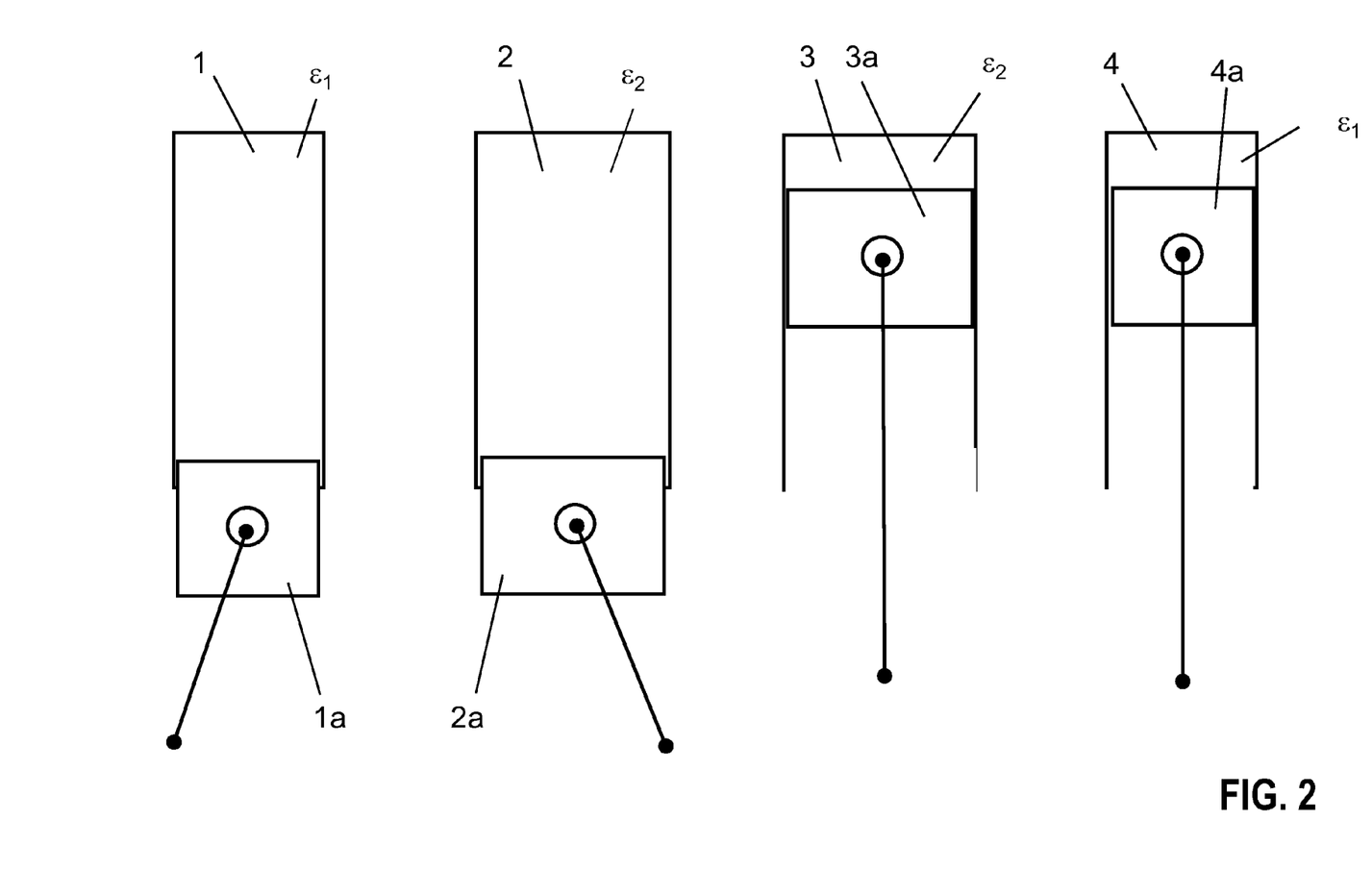
FIG. 2 schematically shows the cylinders of a first embodiment of the internal combustion engine.

Referring now to FIG. 2 an example embodiment of an engine with two groups of cylinders is shown. FIG. 2 schematically shows the four cylinders 1, 2, 3, 4 of a four-cylinder in-line engine.

The four cylinders 1, 2, 3, 4 which are in an in-line configuration form two cylinder groups with in each case two cylinders 1, 2, 3, 4, wherein the first group comprises the outer cylinders 1, 4 and the second group comprises the inner cylinders 2, 3. In the snapshot shown, the pistons 1a, 2a of the first and second cylinders 1, 2 are situated at bottom dead center, and the pistons 3a, 4a of the third and fourth cylinders 3, 4 are situated at top dead center.

It should be appreciated that though a 4 cylinder, in-line engine is shown the method and system of the present disclosure may be adapted to alternate engine configurations. The internal combustion engine according to the disclosure has at least two cylinders or at least two groups with, in each case, at least one cylinder. In this respect, internal combustion engines with three cylinders which are configured in three groups with in each case one cylinder, or internal combustion engines with six cylinders which are configured in three groups with in each case two cylinders, are likewise internal combustion engines according to the disclosure. The three cylinder groups may have different compression ratios $\epsilon_1$ and be activated and deactivated successively within the context of a partial deactivation. The partial deactivation is thereby further optimized. The cylinder groups may also comprise a different number of cylinders.

In the present disclosure the two cylinder groups are characterized by different compression ratios, wherein the cylinders 1, 4 of the first group have a compression ratio $\epsilon_1$ and the cylinders 2, 3 of the second group have a compression ratio $\epsilon_2$, where $\epsilon_2 < \epsilon_1$.

Here, the cylinders 2, 3 of the second group are formed as activatable cylinders 2, 3 which are deactivated in part-load operation when a predefinable load is undershot. As a result, the load demand on the cylinders 1, 4, which remain in operation, of the first group increases, and it is necessary for a throttle flap provided in the intake system for load control to be opened to a greater extent in order to introduce a greater charge-air mass into said cylinders 1, 4 in order to meet the load demand. The result is dethrottling of the internal combustion engine in part-load operation.

In the embodiment illustrated in FIG. 1, the two cylinder groups additionally have different cylinder volumes. The cylinders 1, 4 of the first group have a smaller cylinder volume $V_1$ and the cylinders 2, 3 of the second group have a larger cylinder volume $V_2$ such that the following applies $V_2 > V_1$.

This additionally supports the dethrottling of the internal combustion engine in part-load operation. As a result of the relatively small cylinder volume $V_1$ of the cylinders 1, 4, which are permanently in operation, of the first group, in the event of a partial deactivation, the throttle flap must be opened further or completely already at very low loads in order to introduce charge air into the cylinders 1, 4. It should be appreciated that though the two cylinder groups are shown with different cylinder volumes in FIG. 2, in another embodiment the two cylinder groups may have the same cylinder volume, but vary in compression ratio.

Embodiments of internal combustion engine may be advantageous in which the at least one cylinder of the first group has a compression ratio $\epsilon_1$ and the at least one cylinder of the second group has a compression ratio $\epsilon_2$, where $\epsilon_2 + 1 < \epsilon_1$.

Embodiments of the internal combustion engine are also advantageous in which the at least one cylinder of the first group has a compression ratio $\epsilon_1$ and the at least one cylinder of the second group has a compression ratio $\epsilon_2$, where $\epsilon_2 + 1.5 < \epsilon_1$.

Embodiments of the internal combustion engine are likewise advantageous in which the at least one cylinder of the first group has a compression ratio $\epsilon_1$ and the at least one cylinder of the second group has a compression ratio $\epsilon_2$, where $\epsilon_2 + 2 < \epsilon_1$.

Whereas the three embodiments above are concerned with the relative difference in compression ratio between the two cylinder groups, the following embodiments relate to the absolute compression ratio of the two groups.

Embodiments of the internal combustion engine may be advantageous in which the at least one cylinder of the second group has a compression ratio $\epsilon_2$, where $9<\epsilon_2<11$.

Embodiments of the internal combustion engine may be advantageous in which the at least one cylinder of the first group has a compression ratio $\epsilon_1$, where $11.5<\epsilon_1<14.5$.

The cylinder groups may also differ from one another with regard to other operating parameters or design features, for example the cooling arrangement, the combustion process, the inlet ducts, the outlet ducts, the injection nozzles and/or the ignition devices.

Furthermore, the cylinders of the two cylinder groups may vary in cylinder volume as seen in FIG. 2. The at least one cylinder of the first group may have a cylinder volume $V_1$ and the at least one cylinder of the second group may have a cylinder volume $V_2$, where $V_2>V_1$.

The provision of the two cylinder groups with different cylinder volumes $V_i$ serves in turn for optimization of the partial deactivation in part-load operation. For this purpose, a structural feature of the internal combustion engine or of the cylinders, that is to say the cylinder volume $V_i$, is taken into consideration, specifically in addition to the different compression ratios $\epsilon_i$.

The cylinders, which are permanently in operation, of the first group may have a smaller, preferably considerably smaller cylinder volume $V_1$, such that, in the case of a partial deactivation, the throttle flap can be opened further or completely in order to introduce the charge air into said cylinders already in the lower part-load range of the internal combustion engine, whereby substantial dethrottling of the internal combustion is attained already in the lower part-load range.

Then, in the case of a partial deactivation, the cylinders, which are permanently in operation, of the first group operate at relatively high loads already in the lower part-load range of the internal combustion engine, said relatively high loads being characterized by a low specific fuel consumption. The internal combustion engine consequently has a noticeably higher efficiency $\eta$ in the lower part-load range.

Embodiments of the internal combustion engine may be advantageous in which the at least one cylinder of the first group has a cylinder volume $V_1$ and the at least one cylinder of the second group has a cylinder volume $V_2$, where $1 \cdot V_1 < V_2 < 2 \cdot V_1$.

Embodiments of the internal combustion engine may be advantageous in which the at least one cylinder of the first group has a cylinder volume $V_1$ and the at least one cylinder of the second group has a cylinder volume $V_2$, where $1.3 \cdot V_1 < V_2 < 2 \cdot V_1$.

In the present case, the cylinders, which are permanently in operation, of the first group have a higher compression ratio $\epsilon_1$, such that in part-load operation, said cylinders have a noticeably higher efficiency $\eta$, in particular a higher efficiency than if said cylinders had the lower compression ratio $\epsilon_2$ of the activatable cylinders. It may be taken into consideration here that the efficiency $\eta$ correlates more or less with the compression ratio $\epsilon_i$, that is to say the efficiency $\eta$ is generally higher in the case of a relatively high compression ratio $\epsilon_i$ and is generally lower in the case of a relatively low compression ratio $\epsilon_i$. This basic relationship can however break down toward very high compression ratios, because then inter alia the blow-by increases intensely, which has an adverse effect on efficiency.

The different compression ratios $\epsilon_i$ are the result of the configuration of the cylinder groups for different operating or load ranges. Whereas the cylinders which are permanently in operation are configured for part-load operation of the internal combustion engine, the group of activatable cylinders is configured for higher, high and maximum loads.

The cylinders, which are permanently in operation, of the first group may be provided with a higher compression ratio $\epsilon_1$ and thus configured for optimized part-load operation of the internal combustion engine, because an increased knocking tendency is not to be expected in said load range. By contrast, the activatable cylinders, that is to say the cylinders which are activated in the case of increasing load demand, are configured for high loads. According to the disclosure, said cylinders should be provided with a relatively low compression ratio, because the knocking tendency increases with the compression ratio and also with increasing load. Although this reduces the efficiency of said cylinder group, it provides security against knocking at high loads at which said cylinders are primarily used.

From that which has been stated above, it also emerges that the internal combustion engine according to the disclosure has an increased efficiency $\eta$ in part-load operation and also in the region of higher loads, because the cylinders which are permanently in operation, with their higher compression ratio $\epsilon_1$, can also be operated in said load range and contribute to a higher overall efficiency of the internal combustion engine.

The increased knocking tendency—owing to the higher compression ratio $\epsilon_1$—of the cylinders which are permanently in operation may be allowed for at relatively high loads through the selection of suitable operating parameters, for example by means of a correspondingly selected air ratio $\lambda_1$, which may also, but may not imperatively, deviate from the air ratio $\lambda_2$ of the activatable cylinders.

Figure 3:
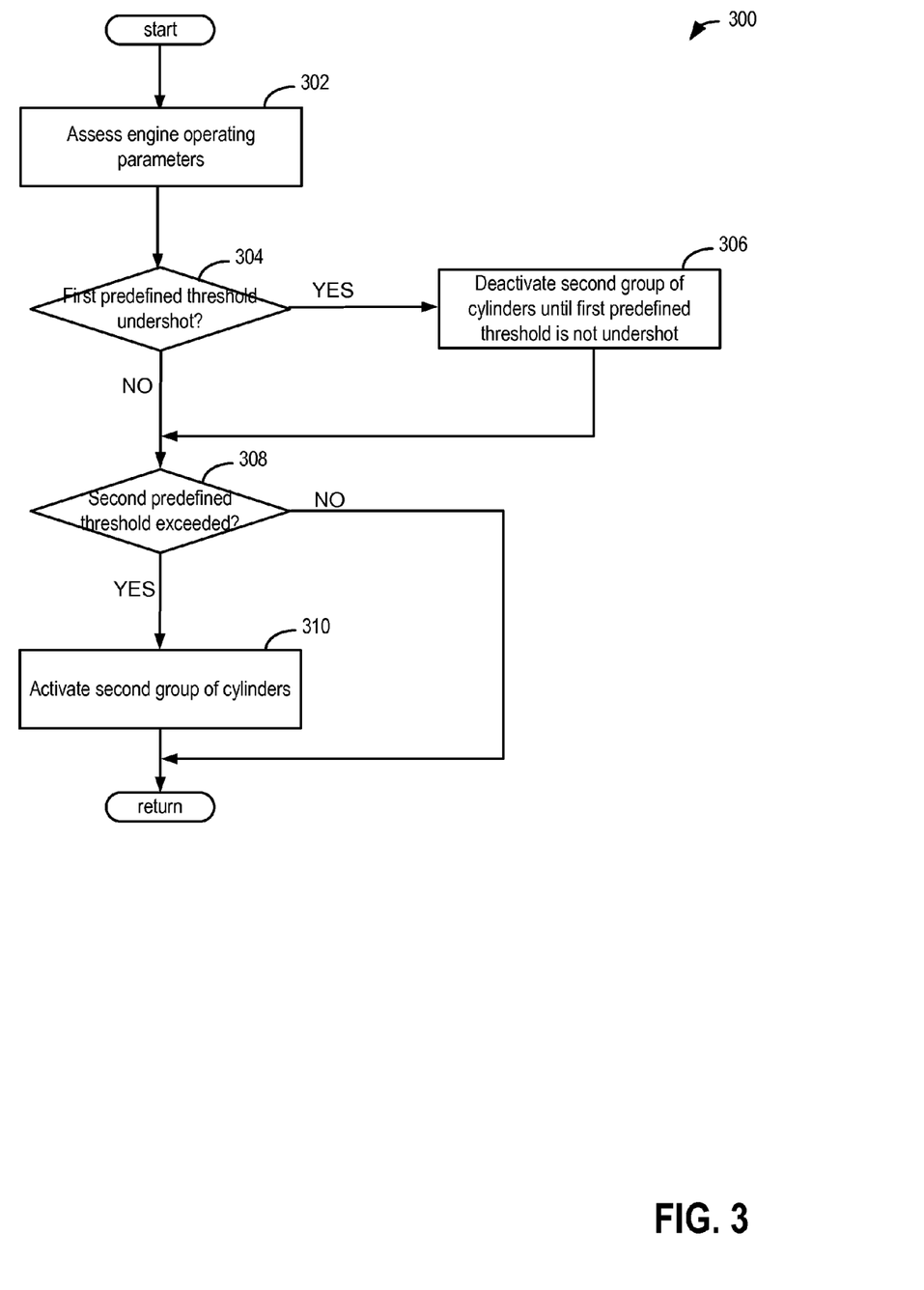
FIG. 3 shows a method of operating an engine in accordance with the present disclosure.

Referring now to FIG. 3, a method 300 for operating an engine in accordance with the present disclosure is shown. The method starts when an engine is operating with the first group of cylinders. The method starts at 302 where engine operating parameters are assessed. These include air-fuel ratio, engine speed, torque, load, etc. At 304, it is determined if the engine load undershoots a first predefined threshold $T_{down}$. The predefined threshold is based on a load that may be sustained by the first group of engine cylinders. An available output of the first group of cylinders may be determined by a compression ratio and cylinder volume of the first group of cylinders. If the first predefined threshold is undershot (YES), the second group of cylinders is deactivated, or maintained inactive, until the first predefined threshold is not undershot. Deactivation of the cylinders may comprise disabling fuel injection, disabling spark ignition, or both. Method variants may be advantageous in which the at least one cylinder of the second group is deactivated when the predefined load $T_{down}$ is undershot and the present load remains lower than said predefined load $T_{down}$ for a predefined time period $\Delta t_1$.

If, at 302, the first predefined threshold is not undershot (NO) the method proceeds to 306. At 308, it is determined if a second predefined threshold is exceeded. This second predefined threshold may be a threshold above which the first group of engine cylinders is insufficient to power the engine alone. The second threshold may comprise a percentage of maximal loads, for example 70% of maximal load. If the second predefined threshold is not exceeded the method returns.

If, at 308 the second predefined threshold $T_{up}$ is exceeded (YES) the second group of cylinders is activated. The cylinders of the second group of cylinders have a lesser compression ratio. Differences between the cylinders of the at least two groups are described herein and tabulated in FIG. 4.

Embodiments of the method may be advantageous in which the fuel supply of a deactivated cylinder and/or the spark ignition of a deactivated cylinder are deactivated.

It is therefore particularly advantageous, corresponding to the method variant in question, if, in the event of a partial deactivation in part-load operation, the fuel supply to a deactivated cylinder of the internal combustion engine is stopped, whereby said cylinder is reliably put out of operation. In this way, a situation is also prevented in which fuel introduced—even in the absence of spark ignition—undesirably auto-ignites owing to the high temperatures of the combustion chamber interior walls or of the residual combustion gases in the cylinder.

Here, the intake charge air can flow through the deactivated cylinder as before, wherein owing to the fact that no fuel is introduced, no combustible or ignitable fuel/air mixture is provided and consequently—even in the case of the ignition spark being initiated—no ignition, and no combustion, takes place in said cylinder.

During the partial deactivation, the deactivated cylinder basically does not contribute to the power output of the internal combustion engine. If the charge air supply is not shut off but rather is maintained, the air supplied to the deactivated cylinder continues to participate in the four working strokes—intake, compression, expansion and exhaust—such that the deactivated cylinder does not output any power and has no spark and/or no injected fuel, but also, work may be performed for the charge exchange in said cylinder, which reduces efficiency, that is to say is thermodynamically disadvantageous. Therefore, method variants may be advantageous in which the air supply to a deactivated cylinder is stopped, in addition to fuel and spark being deactivated, such as through deactivating the cylinder valves for said cylinder.

Embodiments of the method may be advantageous in which the spark ignition of a deactivated cylinder is deactivated.

As has already been discussed further above, in the strictest sense, a cylinder can be deactivated simply through the deactivation of the fuel supply, because in the absence of an introduction of fuel, an ignitable fuel/air mixture which could be ignited and burned by the initiation of an ignition spark is not formed at all.

Nevertheless—even with the fuel supply deactivated—it is particularly advantageous for a cylinder to be deactivated through deactivation of the spark ignition, or to deactivate the spark ignition of a deactivated cylinder, and thereby reliably prevent an undesired ignition for example of residual gases remaining in the cylinder.

The threshold loads $T_{down}$ and $T_{up}$ predefined for the undershooting and exceedance respectively may be of equal magnitude, though may also differ in magnitude.

The introduction of an additional condition for the deactivation of the cylinders of the second group, that is to say the partial deactivation, is intended to prevent excessively frequent activation and deactivation, in particular a partial deactivation, if the load falls below the predefined load $T_{down}$ briefly and then rises again, or fluctuates around the predefined value for the load $T_{down}$, without the undershooting justifying or necessitating a partial deactivation.

For these reasons, method variants are likewise advantageous in which the at least one cylinder of the second group is activated when the predefined load $T_{up}$ is exceeded and the present load remains higher than said predefined load $T_{up}$ for a predefined time period $\Delta t_2$.

Embodiments of the method may be advantageous in which the predefined load $T_{down}$ and/or $T_{up}$ is dependent on the rotational speed n of the internal combustion engine.

There is then one specific load, upon the undershooting of which the at least one cylinder of the second group is deactivated regardless of the rotational speed. Instead, a rotational-speed-dependent approach is followed, and a part-load range in the characteristic map is defined in which partial deactivation is performed.

It is basically possible for further parameters of the internal combustion engine, for example the engine temperature or the coolant temperature after a cold start of the internal combustion engine, to be taken into consideration as a criterion for a partial deactivation.

Figure 4:
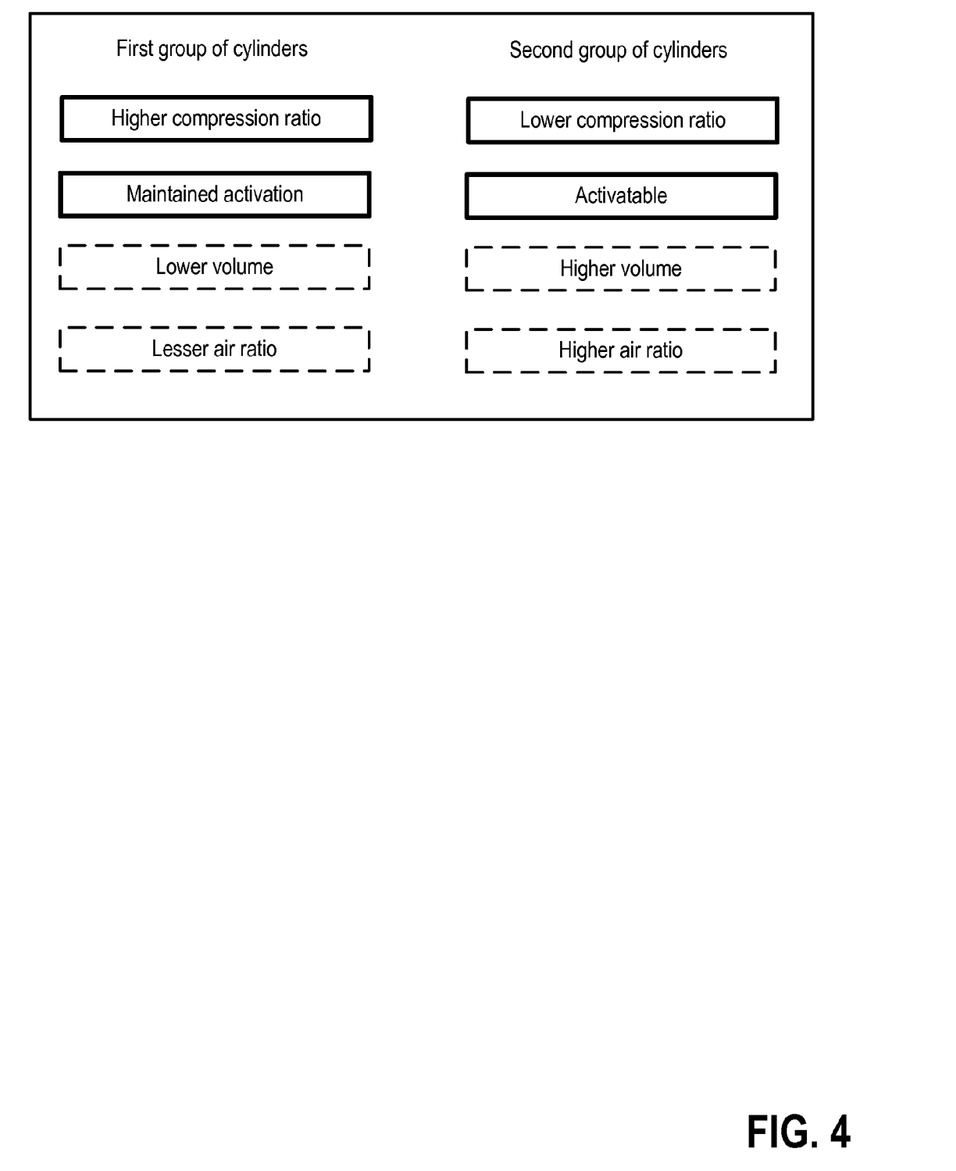
FIG. 4 shows differences among cylinder groups.

Turning now to FIG. 4 ways in which cylinders of the two difference cylinder groups may differ are outlined. The first group of cylinders differs from the second group of cylinders in that the first group has a higher compression ratio and is maintained active. The second group of cylinders has a lower compression ratio and is activatable, such that a partial loads the cylinders may be deactivated for improved efficiency. Other possible differences including compression ratio and air ratio are highlighted in dashed line as these features may vary based on operating parameters or in alternate embodiments. Differences amongst the cylinder groups in air ratio are described below.

Embodiments of the method may be advantageous in which the cylinders of the at least two cylinder groups are operated with different air ratios λ at least in one load range. The at least one cylinder of the first group being operated with a lesser air ratio $\lambda_1$ and the at least one cylinder of the second group being operated with a greater air ratio $\lambda_2 > \lambda_1$.

Embodiments of the method may be advantageous in which the air ratio λ of at least one cylinder group is reduced toward high loads $T_{high}$, a high load $T_{high}$ being a load which amounts to 70% or more of the maximum load $T_{max,n}$ at the present rotational speed n.

To reliably prevent knocking combustion, an enrichment (λ<1) may be used if an increased knocking tendency exists, that is to say in particular at high loads and high temperatures. This may be useful in particular in the cylinders with the higher compression ratio $\epsilon_1$. Here, more fuel is injected than can actually be burned with the provided air quantity, with the excess fuel likewise being heated and evaporated, such that the temperature in the cylinder falls. Said approach is duly considered to be disadvantageous from energy-related aspects, in particular with regard to the fuel consumption of the internal combustion engine and with regard to pollutant emissions, but is nevertheless expedient or admissible in order to prevent knocking and protect components.

Here, embodiments of the method may be advantageous in which the air ratio λ is reduced by means of an increase in the injected fuel quantity.

The air ratio λ could basically also be reduced in order to reduce the air mass provided. A disadvantage of such an approach is however that the reduction of the air mass is, out of principle, associated with a loss in power. It is therefore preferred for the air ratio λ to be reduced, as per the embodiment in question, by means of an increase in the injected fuel quantity.

In the case of an engine with direct injection the injectors are controlled individually by means of an engine controller, and the air ratio λ is set by means of the injected fuel quantity. To set the supplied air quantity, and thus the load, there is provided in the intake system a throttle flap which is likewise controlled and/or regulated by the engine controller.

It is consequently also possible without problems for the cylinders or the cylinder groups to be operated with different air ratios.

Embodiments of the method may be advantageous in which the at least one cylinder of the second group is operated stoichiometrically.

Stoichiometric operation has considerable advantages with regard to exhaust-gas aftertreatment and the use of a three-way catalytic converter, utilizes approximately stoichiometric operation ($\lambda \approx 1$) of the engine. In this case, the overall air ratio which is of relevance here is determined by the charge air masses and fuel quantities supplied to the entirety of the cylinders of the internal combustion engine, such that even slightly enriched operation of the cylinders of the first group is not detrimental to the operation of a three-way catalytic converter. Embodiments of the method may be advantageous in which the cylinders are operated in such a way as to set an overall air ratio $\lambda_{ges} \approx 1$.

A system is provided for an internal combustion engine comprising, at least two cylinders wherein the at least two cylinders form at least two groups, wherein each group comprises at least one cylinder, the at least one cylinder of at least one group being formed as a cylinder which can be activated in a load-dependent manner and which is deactivated if a predefined load is undershot. The at least two groups are characterized by different compression ratios, the at least one cylinder of a first group having a higher compression ratio and the at least one cylinder of a second group having a lower compression ratio and the at least one cylinder of the second group comprises an activatable cylinder. Use of the first cylinder group, and deactivation of the second cylinder group during partial loads increases engine efficiency and fuel economy.

In one example, a method of operating an engine, such as the four-cylinder engine described herein. The method includes operating inner cylinders with a first compression ratio generated by a larger cylinder bore as compared with outer cylinders having a second compression ratio generated by a smaller cylinder bore. Each of the four cylinders may be coupled to a common crankshaft and be formed within a common cylinder block, the cylinders positioned inline, and with cylinder valves operated via a common camshaft. the cylinders may have a firing order of 1-3-4-2 in a four-stroke combustion cycle, with two revolutions of the common crankshaft having each cylinder fire once and only once in the situation where all cylinders are firing evenly. The method may further include deactivating only one of the cylinder groups at loads above a threshold, and maintaining both groups active below the threshold, the threshold adjusted different at different engine speeds. For example, at higher engine speeds, the load threshold may decrease. Each of the four cylinders may have a common (maximum) piston stroke length.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
    if a first predefined load is undershot, deactivating at least one cylinder of a second group of cylinders in an engine comprising at least two cylinders wherein the at least two cylinders form at least two groups;
    if a second predefined load is exceeded, activating the at least one cylinder of a second group of cylinders wherein a first group and a second group of cylinders have different compression ratios, and
    operating the at least two cylinder groups at an air ratio that differs in at least one load range, wherein the at least one cylinder of the first group is operated with a lesser air ratio and the at least one cylinder of the second group is operated with a greater air ratio.

2. The method as claimed in claim 1, wherein the first predefined load and the second predefined load are dependent on a rotational speed of an internal combustion engine.

3. The method as claimed in claim 1, further comprising reducing the air ratio of at least one cylinder group toward high loads, a high load being a load which amounts to 70% or more of a maximum load at the present rotational speed.

4. The method as claimed in claim 3, wherein the air ratio is reduced by means of an increase in an injected fuel quantity.

5. The method as claimed in claim 1, wherein the at least one cylinder of the second group of cylinders is operated stoichiometrically.

6. The method as claimed in claim 1, wherein deactivating the at least one cylinder of the second group of cylinders comprises deactivating a fuel supply and a spark ignition.

* * * * *